United States Patent [19]

Seiden

[11] 4,120,990

[45] Oct. 17, 1978

[54] POLYOXYALKYLENE PROPYLENE GLYCOL ESTERS FOR IMPROVED COOKING AND SALAD OIL

[75] Inventor: Paul Seiden, Cincinnati, Ohio

[73] Assignee: The Procter & Gamble Company, Cincinnati, Ohio

[21] Appl. No.: 783,085

[22] Filed: Mar. 31, 1977

[51] Int. Cl.$^2$ ............................................. A23D 5/00
[52] U.S. Cl. .................................................. 426/601
[58] Field of Search ............... 426/601, 602, 603, 604, 426/606, 611, 609

[56] References Cited

U.S. PATENT DOCUMENTS

| | | | |
|---|---|---|---|
| 3,415,660 | 12/1968 | Purves et al. | 426/604 |
| 3,490,918 | 1/1970 | Egan et al. | 426/611 |
| 3,943,259 | 3/1976 | Norris | 426/606 X |

*Primary Examiner*—Robert A. Yoncoskie
*Attorney, Agent, or Firm*—Leonard Williamson

[57] ABSTRACT

A liquid glyceride base oil and plyoxyalkylene propylene glycol ester provide an improved cooking and salad oil composition having improved blendability in vinegar-and-oil salad dressings without significantly increasing fat absorption in foodstuffs fried therein, e.g., french fried potatoes. The base oil is preferably one which is clear and winterized.

12 Claims, No Drawings

POLYOXYALKYLENE PROPYLENE GLYCOL ESTERS FOR IMPROVED COOKING AND SALAD OIL

BACKGROUND OF THE INVENTION

This invention is concerned with cooking and salad oil compositions comprising liquid glyceride base oils and an emulsifier.

The oil and fat products used for edible purposes may be divided into two fairly distinct classes: (1) liquid oils, such as soybean, cottonseed, and olive oils; and (2) plastic fats, such as butter, margarine, shortening and lard.

The liquid vegetable oils are generally used as cooking and salad oils. In preparing green salads, a liquid cooking or salad oil is used to provide an oil coating on the basic ingredients of the salad. A solid fat or plastic shortening is not well suited for this purpose. Liquid oils are often preferred over solid fats and plastic shortenings for many cooking tasks; for example, the frying of potatoes, fish, eggs, and meat products such as cube steaks, minute steaks, and the like. In the deep frying of food products such as chicken, potatoes, and potato chips, liquid oils are frequently used. Liquid oils are exclusively used in the preparation of vinegar-and-oil salad dressings and mayonnaise where the blendability, consistency and stability of the final product is often adversely affected by solid or plastic fats or shortenings.

It is known that the blendability of salad oil in vinegar is improved by the addition of certain emulsifiers, e.g., the polyoxyethylene sorbitan monooleate. (U.S. Pat. No's. 3,415,658, December, 1968, Cunningham, et al.; and 3,355,302, Purves et al., November, 1967.) Polyoxyethylene(20)sorbitan monooleate, commonly called polysorbate 80 and sold under tradename of Tween 80, is an excellent example.

Besides providing excellent vinegar-and-oil blendability, polysorbate 80 unfortunately causes an excessive increase in absorbed fat in foodstuffs fried therein.

It is also known that certain general classes of materials such as sorbitan partial esters, polyoxyalkylene derivatives of a propylene glycol higher fatty acid ester (U.S. Pat. No. 3,767,822) and polyethoxylated ethers of sorbitan partial esters have useful emulsifying properties for plastic and liquid shortenings. For example, their use in fluid shortening for bakery products is disclosed in U.S. Pat. No's. 3,943,259, Norris, March, 1976; 3,914,452, Norris, November, 1975. Also see U.S. Pat. No. 3,767,822, Oszlanyi et al., November, 1973 for the preparation and use of polyethoxylated propylene glycol monoesters and the like in bakery products. These patents teach broad classes of materials and broad ranges of concentrations for these materials. It was not previously known that the particular esters polyoxyalkylene derivatives of propylene glycol higher fatty acid esters (POA PGE), described in this invention are useful in amounts of from 0.005% to about 1.0% by weight, in a liquid glyceride base oil to impart improved blendability but low fat absorption properties to the oil.

The above deficiencies in the prior art liquid salad and cooking oils are overcome by the liquid salad and cooking oil of this invention based on liquid base oils containing POA PGE in the amount of from about 0.005% to about 1.0% by weight of said liquid base oil.

It has now been found that liquid salad and cooking oil comprising a glyceride base oil and POA PGE emulsifier will provide improved vinegar-and-oil blendability.

A further advantage is that the liquid oil of this invention is particularly suitable for deep fat frying because the POA PGE emulsifier in the oil composition does not cause a significant increase in fat absorption in the foodstuffs fried therein.

These and other advantages will become more apparent from the detailed description of the invention.

SUMMARY OF THE INVENTION

The liquid oil composition of this invention contains by weight from about 0.005% to about 1.0% of a polyoxyalkylene derivative of a propylene glycol higher fatty acid ester emulsifier. The emulsifier for the liquid oil composition is produced by reacting food grade propylene glycol mono- or diester with alkylene oxide in a ratio of from about 5 to 35 moles of alkylene oxide to 1 mole of propylene glycol mono- or diester in the presence of a catalyst. The emulsifier is mixed into liquid base oil at levels of from about 0.005% to about 1.0% to provide improved vinegar-and-oil salad blendability without causing an excessive increase in fat absorption in fried foods. Polyoxyethylene(20)propylene glycol monooleate is a preferred emulsifier.

DETAILED DESCRIPTION OF THE INVENTION

The cooking and salad oil composition of this invention is produced from a suitable liquid glyceride base oil and a minor amount of a polyoxyalkylene derivative of propylene glycol higher fatty acid ester emulsifier dispersed therein.

By a polyoxyalkylene derivative of a propylene glycol higher fatty acid ester (POA PGE), I refer to ethylene or propylene oxide condensation products of the propylene glycol ester. The product containing solely ethylene oxide, is referred to as the polyoxyethylene derivative of propylene glycol higher fatty acid ester or POE PGE. The POE PGE's should be, for preferred results, the monoesters although some diester may be present.

Preferably the liquid glyceride base oil is a clear one. Suitable edible oils can be obtained by resort to conventional refining and deodorization methods, e.g., treatment with alkali to remove various impurities. When required, the oil will also be winterized or dewaxed in known manner. Of course, most edible oils are deodorized. A wide variety of liquid glyceride base oils can be used in the cooking and salad oil compositions of this invention. Included among suitable oils are, for example, soybean oil, peanut oil, olive oil, sunflower seed oil, safflower oil, and sesame seed oil. Other glyceride oils such as, for example, cottonseed oil and corn oil, are also useful. The oils of the invention may be given a "winterizing," dewaxing, or similar treatment to remove the higher melting stearins before being hused as a base oil. Certain oils such as, for example, soybean oil, can be partially hydrogenated before use to improve their resistance to oxidative deterioration during prolonged storage periods; the higher melting solids formed during the hydrogenation treatment are preferably removed by winterization.

Suitable liquid glyceride base oils also can be obtained by directed, low temperature interesterification or rearrangement of animal or vegetable fatty materials, followed by the removal of the higher melting solids formed during the reaction. For an example of this procedure, see U.S. Pat. No. 2,442,532. Another group of oils suitable for use as the liquid glyceride base oil is that group of oils in which one or more short-chain fatty acids, such as acetic acid and propionic acid replace in part the long-chain fatty acids present in natural triglyceride oils.

The liquid oil composition of this invention further includes between about 0.005% to 1.0% by weight of a POA PGE emulsifier which improves vinegar-and-oil blendability without causing significant increased fat absorption in fried foods. The preferred ester emulsifier is the polyoxyethylene propylene (10–30) glycol monoester (U.S. Pat. No. 3,767,822). As used and defined herein, the number or numbers in parenthesis indicate the number of moles of ethylene oxide that are reacted with each mole of PGME during the ethoxylation reaction. Polyoxyethylene(20)propylene glycol monooleate (POE(20)PGMO) is most preferred and will provide excellent salad oil blendability. A liquid base oil made with 0.05 weight percent POE(20)PGMO will provide salad oil blendability approximately equivalent to a like oil made with 0.125 weight percent polysorbate 80 but will cause only about 4% of the increase in fat absorption as does the oil containing the polysorbate 80. (See Table III).

Alkoxylated PGMO or more particularly polyoxyethylene propylene glycol monooleate (POE PGMO) can be prepared using a standard ethoxylation procedure (see U.S. Pat. No. 3,767,822). Examples of suitable emulsifiers of the invention include POE (10)PGMO, POE(20)PGMO and POE(30) PGMO. As used and defined herein, the number or numbers in parenthesis indicate the number of moles of ethylene oxide that are reacted with each mole of PGMO during the ethoxylation reaction.

The ester portion of the polyethoxylated propylene glycol ester is supplied by a higher fatty acid or fatty acid radical-supplying material, e.g., a glyceride. By a higher fatty acid ester, it is meant those esters in which the fatty acid radical portion has between 12–22 carbon atoms in the structure. The fatty acid can be saturated or unsaturated and preferably is derived from linoleic, oleic, stearic, palmitic acids, and others well known in the art.

A series of test salad oils was prepared with a standard base oil of refined, bleached and deodorized, partially hydrogenated, winterized soybean oil and various concentrations of each emulsifier. The emulsifier was added to the oil by heating some of the oil to approximately 140° F. and then adding emulsifier to the oil in a Waring blender until a 2 to 5% concentrate was made. This concentrated oil/emulsifier solution was then added to room-temperature base oil until the desired concentration was reached. This concentrate method was employed to allow more accuracy in making up the various concentrations needed for the test.

Tables I, II and III illustrate the blendability and fat absorption results found by these tests. It was found that the blendability results for POE(10)PGMO and POE(30)PGMO are better than or equal to that achievable with polysorbate 80. It was found also that in all cases the blendability achievable with POE(20)PGMO is almost twice that of polysorbate 80 at the same concentration. It was further found that the functionality of POE PGMO reaches a peak between POE(10)PGMO and POE(30)PGMO and that POE(20)PGMO is approximately at that peak.

It was concluded from these tests that POE(20)PGMO was the most promising emulsifier tested. The emulsifier level chosen to give blendability approximately equivalent to polysorbate 80 was 0.05 weight percent POE(20)PGMO in base oil. This emulsifier level provides 5 min./30ml. blendability.

TABLE I

| Vinegar & Oil Blendability | | |
|---|---|---|
|  | 30 ml. | 60 ml. |
| Base Oil (no emulsifier) | 32 sec. | 45 sec. |
| Base Oil (0.125% polysorbate 80) | 331 sec | 871 sec. |
| Base Oil (0.05% POE(20)PGMO) | 330 sec. | 700 sec. |

BLENDABILITY TEST PROCEDURE

The standard salad dressing used for testing blendability is given below.

100 gms. vinegar
182 gms. oil
6 gms. salt

These components are added together in a 500 ml. Fleaker (Trade name, Corning Glassware) with a minimum amount of mixing.

A standard shake test was devised using a mechanical shaker (Burrell Wrist Action Shaker, Burrell Corp., Pittsburgh, PA). The mechanical shaker was adjusted to shake for 5 seconds with the Fleaker being held a distance of 7 incher from the center of the shaker arm to the center of the Fleaker. The cycle rate of the shaker was 360 shakes/minute, and the cycle lenght was 3 inches. A mailing tube was used to hold the Fleaker during the shaking.

To perform the blendability test, a test salad dressing is placed in the mailing tube, and the mechanical shaker is started. A timer is started when the shaking action stops. The Fleaker is then removed from the holder and set on the counter to allow the vinegar/oil emulsion to separate into the oil and vinegar phases. The times necessary for the vinegar phase to reach a 30 ml. and 60 ml. separation are recorded. Using this test method on base oil which contained 0.125% polysorbate 80 resulted in 30 ml. and 60 ml. separation times of approximately 330 and 870 seconds. The 30 ml. separation time was chosen as the performance target for testing emulsifiers for improved blendability.

FAT ABSORPTION TESTING — MASS BALANCE METHOD

Having found that POE(20)PGMO provided the desired vinegar and oil blendability, it was necessary to test an oil containing this emulsifier against a control oil without this emulsifier for fat absorption increases in frying. Frozen french fries were chosen as the test standard.

The fat absorption test is performed by frying 2.5 pounds of frozen french fried potatoes in a deep fat fryer with a known weight of oil. After each frying the weight of the oil is determined. The weight loss of the oil is considered to be the total amount of fat absorbed. Tin foil is used underneath the fryers and weighed after each run to account for any oil lost by spattering of the oil out of the fryer. This test is performed at least 6 times for each oil, and an average absorption based on 2.5 pounds of starting french fries is obtained. The difference in absorption between the control oil and the oil containing the emulsifier is recorded.

The procedure used in testing the fat absorption of oils is as follows: (1) Use regular-cut Idaho frozen french fries; (2) obtain a clean and dry commercially available home deep fryer with basket (Presto, 5 qt. deep fryer); (3) add 1400 g. of oil to the deep fryer; (4) record the weight of the whole unit; (5) place the deep fryer on weighed tin foil to collect and record the amount of spatter; (6) heat the deep fryer to 365° F.; (7) add 568 g. of frozen potatoes to the basket, and lower it into the oil; (8) fry for 9 minutes; (9) remove fries from the oil and shake 10 times in the basket. Allow the potatoes to drain for 3 minutes, and then shake an additional 10 times. Dump the french fries out into a tin pan; (10) fry another 568 g. of frozen potatoes following Steps 7 through 9; (11) after Step 10 is completed, weigh the basket and fryer to determine the weight loss. This constitutes one run; (12) repeat Steps 4 through 11 two more times using the same oil in the deep fryer; (13) weigh the tin foil at the completion of Step 12, and make the appropriate correction in the recorded weight of the oil absorbed in frying; (14) If two deep fryers are being used at the same time, switch fryers at this point, and repeat Steps 1 through 13. This will eliminate fryer-to-fryer variation in the fat absorption data.

A comparative fat-absorption summary is given in Table III.

A further advantageous aspect of this invention is that the emulsifier of this invention meet the following commercial requirements: color, oil flavor, cold test and aging stability. (See U.S. Pat. No. 3,415,660 for a discussion of such commercial requirements.)

According to one aspect of this invention, the POA PGE component, prior to its admixture with the base oil, is acid treated to a pH of about 6.0 to about 7.0 in ethanol.

The following examples further illustrate the present invention; however, it is understood that the invention is not limited thereto since other variations will be readily discernible to those skilled in the art after reading a description of the invention. All percentages and proportions are by weight unless otherwise specified. The test procedures are the same as those set out above unless otherwise specified.

EXAMPLE I

Eight cooking and salad oil compositions were prepared from a liquid base oil comprising refined, bleached and deodorized soybean oil partially hydrogenated and winterized after hydrogenation. Acid-treated POE(20)PGMO was dispersed in seven of the eight compositions in the amounts shown in Table II by thoroughly mixing the POE(20)PGMO and the base oil for three minutes in a Waring blender. The base oil without the POE(20)PGMO was used as a control.

Blendability tests were performed following the procedure outlined above.

TABLE II

SALAD DRESSING BLENDABILITY

| POE(20)PGMO Weight percent composition | 30 ml. separation time in seconds | 60 ml. separation time in seconds |
|---|---|---|
| 0.0 (100% Base Oil)* | 30 sec. | 45 sec. |
| 0.005 | 40 " | 75 " |
| 0.010 | 65 " | 140 " |
| 0.020 | 112 " | 295 " |
| 0.025 | 180 " | 465 " |
| 0.030 | 250 " | 610 " |
| 0.050* | 300 " | 700 " |
| 0.100 | 550 " | 1010 " |
| 1.00 | 910 " | 1930 " |

*Used for fat absorption test (See Example II and Table III)

EXAMPLE II

An additional cooking and salad oil composition was prepared from the same base oil as in Example I except that 0.125% Tween 80 ® (polysorbate 80) was used instead of POE(20) PGMO.

Fat absorption tests were preformed following the procedure outlined above for this oil and the oil of Example I containing 0.05% POE(20)PGMO. The results are shown in Table III.

TABLE III

FAT ABSORPTION COMPARATIVE TEST

| | 0.5% POE(20)PGMO | 0.125% Tween 80 | No emulsifiers control |
|---|---|---|---|
| Blendability | | | |
| 30 ml. | 300 sec. | 331 sec. | 30 sec. |
| 60 ml. | 700 sec. | 871 sec. | 45 sec. |
| Fat absorption in deep fat frying by 2½ lbs. of potatoes | .6 gm. increase over base | 14.8 gm. increase over base | base |

What is claimed is:

1. A cooking and salad oil composition having improved blendability in vinegar-and-oil salad dressings and low fat absorption in foodstuffs fried therein, said composition consisting essentially of a liquid glyceride base oil containing from about 0.005% to about 1.0% by weight of a polyoxyalkylene propylene glycol ester emulsifier containing from about 5 to about 35 oxyalkylene units per molecule and having a higher fatty acid portion in said ester of about 12 to about 22 carbon atoms.

2. The composition of claim 1 wherein said emulsifier comprises a polyoxyethylene(10-30) propylene glycol monoester.

3. The composition of claim 2 wherein said emulsifier comprises at least 50% of said monoester.

4. The composition of claim 1 wherein said composition comprises about 0.01% to about 0.10% by weight of polyoxyethylene(20)propylene glycol monooleate.

5. The composition of claim 1 in which the liquid glyceride base oil is selected from the group consisting of soybean oil, peanut oil, cottonseed oil, corn oil, olive oil, sunflower oil, safflower oil, and sesame oil.

6. The composition of claim 1 wherein said liquid glyceride base oil is a clear base oil.

7. The composition of claim 1 wherein said emulsifier, prior to its admixture with the base oil, is acid treated to a pH of about 6.0 to about 7.0 in the presence of ethanol.

8. A method of making a salad and cooking oil composition having improved vinegar-and-oil blendability but low fat absorption by foodstuffs fried in said oil composition consisting essentially of: admixing in a liquid glyceride base oil from about 0.005% to about 1.0% by weight, of a polyalkylene propylene glycol ester containing from about 5 to about 35 oxyalkylene units per molecule and having a higher fatty acid portion in said ester of about 12 to about 22 carbon atoms.

9. The method of claim 8 wherein said composition comprises about 0.01% to about 0.10% by weight of polyoxyethylene(20)propylene glycol monooleate, and said liquid glyceride base oil is a clear base oil.

10. The method of claim 8 wherein said base oil is selected from the group consisting of soybean oil, peanut oil, cottonseed oil, corn oil, olive oil, sunflower oil safflower oil, and sesame oil.

11. The method of claim 8 wherein said emulsifier, prior to its admixture with the base oil, is acid treated to a pH of about 6.0 to about 7.0 in the presence of ethanol.

12. The method of claim 8 wherein said higher fatty acid ester comprises palmitic acid ester.

* * * * *